United States Patent
Sujan et al.

(10) Patent No.: US 7,861,580 B2
(45) Date of Patent: Jan. 4, 2011

(54) VIRTUAL TURBINE SPEED SENSOR

(75) Inventors: Vivek A. Sujan, Columbus, IN (US);
Adrian P. Dale, Columbus, IN (US);
Jeffrey Matthews, Columbus, IN (US);
Kent Krajewski, Columbus, IN (US);
David Stroh, Columbus, IN (US); Ryo Fuchinoue, Greensburg, IN (US)

(73) Assignee: Cummins IP, Inc., Minneapolis, MN (US)

( * ) Notice: Subject to any disclaimer, the term of this patent is extended or adjusted under 35 U.S.C. 154(b) by 287 days.

(21) Appl. No.: 12/144,494

(22) Filed: Jun. 23, 2008

(65) Prior Publication Data

US 2009/0314082 A1 Dec. 24, 2009

(51) Int. Cl.
*G01M 15/04* (2006.01)

(52) U.S. Cl. .................................. 73/114.77
(58) Field of Classification Search .............. 73/112.01, 73/112.03, 112.05, 114.77
See application file for complete search history.

(56) References Cited

U.S. PATENT DOCUMENTS

| | | | |
|---|---|---|---|
| 5,142,866 | A | 9/1992 | Yanagihara et al. |
| 5,154,058 | A | 10/1992 | Mizuno |
| 6,401,457 | B1 | 6/2002 | Wang et al. |
| 6,427,445 | B1 | 8/2002 | Isaac et al. |
| 6,725,659 | B1 | 4/2004 | Shao et al. |
| 2006/0032224 | A1 | 2/2006 | Akins et al. |
| 2009/0055072 | A1* | 2/2009 | He et al. ..................... 701/102 |
| 2009/0165458 | A1* | 7/2009 | Matthews ..................... 60/600 |
| 2009/0178417 | A1* | 7/2009 | Draper et al. ................ 60/783 |

FOREIGN PATENT DOCUMENTS

| | | |
|---|---|---|
| JP | 61119768 U | 7/1986 |
| JP | 2008510094 A | 4/2008 |
| KR | 1020040037779 A | 5/2004 |
| WO | 2006020500 A1 | 2/2006 |
| WO | 2008049716 A2 | 5/2008 |

OTHER PUBLICATIONS

PCT/US2009/048302, International Search Report and Written Opinion, Jan. 25, 2010.

* cited by examiner

*Primary Examiner*—Eric S McCall
(74) *Attorney, Agent, or Firm*—Kunzler Needham Massey & Thorpe (57) ABSTRACT

According to one exemplary embodiment, a virtual turbine speed sensor for a multi-stage turbocharger system of an internal combustion engine is disclosed. The multi-stage turbocharger system includes at least two sequential turbochargers each having a compressor and a turbine. The virtual turbine speed sensor includes a compressor efficiency module, an inter-stage air temperature module, and a turbine speed module. The compressor efficiency module is configured to estimate an efficiency of a compressor of a first of the at least two turbochargers. The inter-stage air temperature module is configured to estimate an inter-stage temperature of air between the at least two compressors. The inter-stage temperature estimate is based at least partially on the efficiency of the compressor of the first turbocharger. The turbine speed module is configured to estimate a speed of a turbine of a second of the at least two turbochargers. The speed estimate of the turbine of the second turbocharger is based at least partially on the temperature estimate of air between the at least two compressors.

25 Claims, 9 Drawing Sheets

VIRTUAL TURBINE SPEED SENSOR

FIELD

This invention relates to a sequential multiple-stage turbocharger system and more particularly to a virtual turbine speed sensor for estimating a speed of at least one turbine of the turbocharger system.

BACKGROUND

Sequential multiple-stage turbocharger systems are known in the art. Generally, sequential multiple-stage turbocharger systems include two or more turbochargers operating in series. In diesel internal combustion engines, such systems typically are two-stage turbocharger systems with a high pressure turbocharger stage coupled to a low pressure turbocharger stage. The high pressure turbocharger is generally smaller and has a turbine that receives exhaust gas generated by the engine. After passing through the high pressure turbocharger, the exhaust gas is received by the turbine of a low pressure turbocharger. From the low pressure turbocharger, the exhaust is received by an exhaust gas aftertreatment system, if available, and expelled into the environment.

The exhaust passing through the turbine of the low pressure turbocharger drives, e.g., rotates, the turbine, which causes a compressor to correspondingly rotate via a connecting rod coupling the turbine and compressor. Rotation of the compressor compresses intake air from the environment. After passing through the compressor of the low pressure turbocharger, the compressed air is received by the compressor of the high pressure turbocharger. The high pressure compressor is driven by the high pressure turbine via a connecting rod to further compress the air before sending the air to an intake manifold of the engine.

The rotational speeds, i.e., RPM, of the turbines must be monitored to protect the turbines from overspeed and excessive loading conditions. For example, if the speed of a turbine reaches or exceeds a predetermined upper threshold, the turbocharger system can open turbine and/or compressor bypass valves, as well as command other engine parameters, to reduce the speed of the turbine. Conventional sequential multiple-stage turbocharger systems use at least two physical turbine speed sensors, one for each of the turbines, to determine the speed of the turbines. However, compared to virtual sensors, physical sensors can be expensive and difficult to incorporate into on board diagnostic systems. Accordingly, there is a need for replacing physical speed sensors with virtual speed sensors that can accurately predict turbine speeds in multiple-stage turbocharger systems.

SUMMARY

From the foregoing discussion, it should be apparent that a need exists for virtual turbine speed sensors for accurately determining the turbine speeds of a multiple-stage turbocharger system. Beneficially, such virtual turbine speed sensors can, in certain implementations, overcome one or more shortcomings associated with the use of physical speed sensors to determine the speeds of multiple-stage turbocharger turbines. Accordingly, described herein are embodiments of a virtual turbine speed sensor and associated systems and methods.

For example, according to one exemplary embodiment, a virtual turbine speed sensor for a multi-stage turbocharger system of an internal combustion engine is disclosed. The multi-stage turbocharger system includes at least two sequential turbochargers each having a compressor and a turbine. The virtual turbine speed sensor includes a compressor efficiency module, an inter-stage air temperature module, and a turbine speed module. The compressor efficiency module is configured to estimate an efficiency of a compressor of a first of the at least two turbochargers. The inter-stage air temperature module is configured to estimate an inter-stage temperature of air between the at least two compressors. The inter-stage temperature estimate is based at least partially on the efficiency of the compressor of the first turbocharger. The turbine speed module is configured to estimate a speed of a turbine of a second of the at least two turbochargers. The speed estimate of the turbine of the second turbocharger is based at least partially on the temperature estimate of air between the at least two compressors.

According to some implementations, the efficiency of the compressor of the first turbocharger is based at least partially on a sensed air pressure and air temperature at an inlet of the compressor of the first turbocharger and a mass flow rate of air entering the compressor of the first turbocharger.

In certain implementations, the virtual turbine speed sensor includes a pipe loss module configured to estimate a corrected air pressure and corrected air temperature at the inlet of the compressor of the first turbocharger. The corrected air pressure and corrected air temperature are based at least partially on a sensed air pressure and sensed air temperature. The efficiency of the compressor of the first turbocharger is based at least partially on the corrected air pressure, corrected air temperature, and a mass flow rate of air entering the compressor.

In some instances, the compressor efficiency module includes a compressor efficiency look-up table comprising predetermined compressor efficiency values for given compressor inlet corrected air mass flow rates and compressor inlet air pressure ratios. The compressor efficiency estimate is obtainable from the compressor efficiency look-up table. In some implementations, the inter-stage temperature estimate is based at least partially on an inter-stage air pressure, an inlet pressure of the compressor of the first turbocharger, and an inlet temperature of the compressor of the first turbocharger.

The speed estimate of the turbine of the second turbocharger can be based at least partially on an air mass flow into the compressor of the second turbocharger and a pressure ratio of air entering the compressor of the second turbocharger. In some implementations, the turbine speed module comprises a compressor speed look-up table that includes predetermined compressor speed values for given corrected mass flow rates and pressure ratios. The turbine speed estimate is obtainable from the compressor speed look-up table.

In certain implementations, the air mass flow includes a corrected air mass flow estimate and the pressure ratio includes a ratio of an inter-stage pressure to a second compressor outlet pressure. The corrected air mass flow estimate can be a function of the inter-stage air temperature estimate, the inter-stage air pressure, and a sensed air mass flow. The second compressor outlet pressure can be a corrected second compressor outlet pressure based at least partially on a sensed second compressor outlet pressure. The virtual sensor can include a pipe loss module configured to determine air pressure pipe losses corresponding to the outlet of the compressor of the second turbocharger. The corrected second compressor outlet pressure estimate includes the sum of a sensed second compressor outlet air pressure and the air pressure pipe losses corresponding to the outlet of the compressor of the second turbocharger.

According to another embodiment, an internal combustion engine system includes an internal combustion engine that is operable to generating exhaust gas. The engine system also includes a multi-stage turbocharger that is capable of being exhaust receiving communication and air intake charge transmitting communication with the internal combustion engine. The multi-stage turbocharger includes a high pressure turbocharger in sequence with a low pressure turbocharger, and the high and low pressure turbochargers each comprise a compressor coupled to a turbine. The engine system further includes a plurality of physical sensors operable to sense various operating conditions of the engine system. Additionally, the engine system includes a virtual turbine speed sensor that is operable to estimate a speed of the high pressure turbine. The high pressure turbine speed estimate is based at least partially on an estimated efficiency of the low pressure compressor, an estimated inter-stage temperature of air flowing between the low pressure and high pressure compressors, and at least one operating condition sensed by the plurality of physical sensors.

In certain implementations, the estimated efficiency of the low pressure compressor is based at least partially on Equation 13 below and $P_2/P_1$, where $\dot{m}$ is a mass flow rate of air into the low pressure compressor, $T_{in}$ is a temperature of air entering the low pressure compressor, $P_{in}$ and $P_1$ are the pressure of air entering the low pressure compressor, and $P_2$ is an inter-stage pressure of air between the high and low compressors.

According to some implementations, the estimated inter-stage temperature of air is based at least partially on Equation 14 below, where $T'_1$ is a temperature of air entering the low pressure compressor, $P'_1$ is a pressure of air entering the low pressure compressor, $P_2$ is an inter-stage pressure of air between the high and low compressors, $\eta_{LP}$ is the estimated efficiency of the low pressure compressor, and $\gamma$ is the heat capacity ratio of air.

The high pressure turbine speed estimate can be based at least partially on Equation 13 below and $P_2/P_1$, where $\dot{m}$ is a mass flow rate of air into the high pressure compressor, $T_{in}$ is the estimated inter-stage temperature, $P_{in}$ and $P_1$ are the pressure of air entering the high pressure compressor, and $P_2$ is a pressure of air downstream of the high pressure compressor.

According to specific exemplary implementations, the system further includes an air intake throttle intermediate the high pressure compressor and the internal combustion engine. The pressure of air downstream of the high pressure compressor $P_2$ is a corrected high pressure compressor outlet air pressure. The corrected high pressure compressor outlet air pressure can be dependent upon a valve angle of the air intake throttle. If the valve angle is below a predetermined valve angle threshold, the corrected high pressure compressor outlet air pressure is estimated as a function of air density, air flow velocity, air mass flow rate, length of air flow, and total air flow area. Alternatively, if the valve angle is above a predetermined valve angle threshold, the corrected high pressure compressor outlet air pressure is estimated as a function of: (i) the air intake throttle valve angle and the air mass flow rate in one implementation; (ii) the air intake throttle valve angle and a pressure of the air downstream of the air intake throttle in another implementation; and (iii) a sensed pressure of air downstream of the air intake throttle, a heat capacity ratio of air, the air mass flow rate, a gas constant of air, a temperature of air downstream of the high pressure compressor, and a flow area of air downstream of the air intake throttle.

In some implementations, the virtual turbine speed sensor is operable to estimate a speed of the low pressure turbine.

According to another embodiment, a method for estimating the speed of a high pressure turbine of a multiple-stage turbocharger system having a high pressure compressor coupled to the high pressure turbine and a low pressure turbine coupled to a low pressure compressor includes several events. The method can include estimating an efficiency of the low pressure compressor, estimating an inter-stage air temperature based at least partially on the efficiency of the low pressure compressor, and estimating a speed of the high pressure turbine based at least partially on the inter-stage temperature.

In certain implementations, estimating the efficiency of the low pressure compressor includes determining a low pressure compressor inlet pressure ratio and a low pressure compressor inlet corrected air mass flow rate. Estimating the efficiency of the low pressure compressor also includes comparing the determined low pressure compressor inlet pressure ratio and low pressure compressor inlet corrected air mass flow rate with predetermined low pressure compressor efficiency values.

In the method, estimating the inter-stage air temperature can include determining a low pressure compressor inlet air pressure, an inter-stage air pressure, and a low pressure compressor inlet air temperature. Moreover, in some implementations, estimating the high pressure turbine speed includes determining a high pressure compressor inlet pressure ratio and a high pressure compressor inlet corrected air mass flow rate. The high pressure compressor inlet pressure ratio and high pressure compressor inlet corrected air mass flow rate are based at least partially on an inter-stage pressure and the inter-stage temperature. Estimating the high pressure turbine speed can also include comparing the determined high pressure compressor inlet pressure ratio and corrected air mass flow rate with predetermined high pressure compressor turbine speeds.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
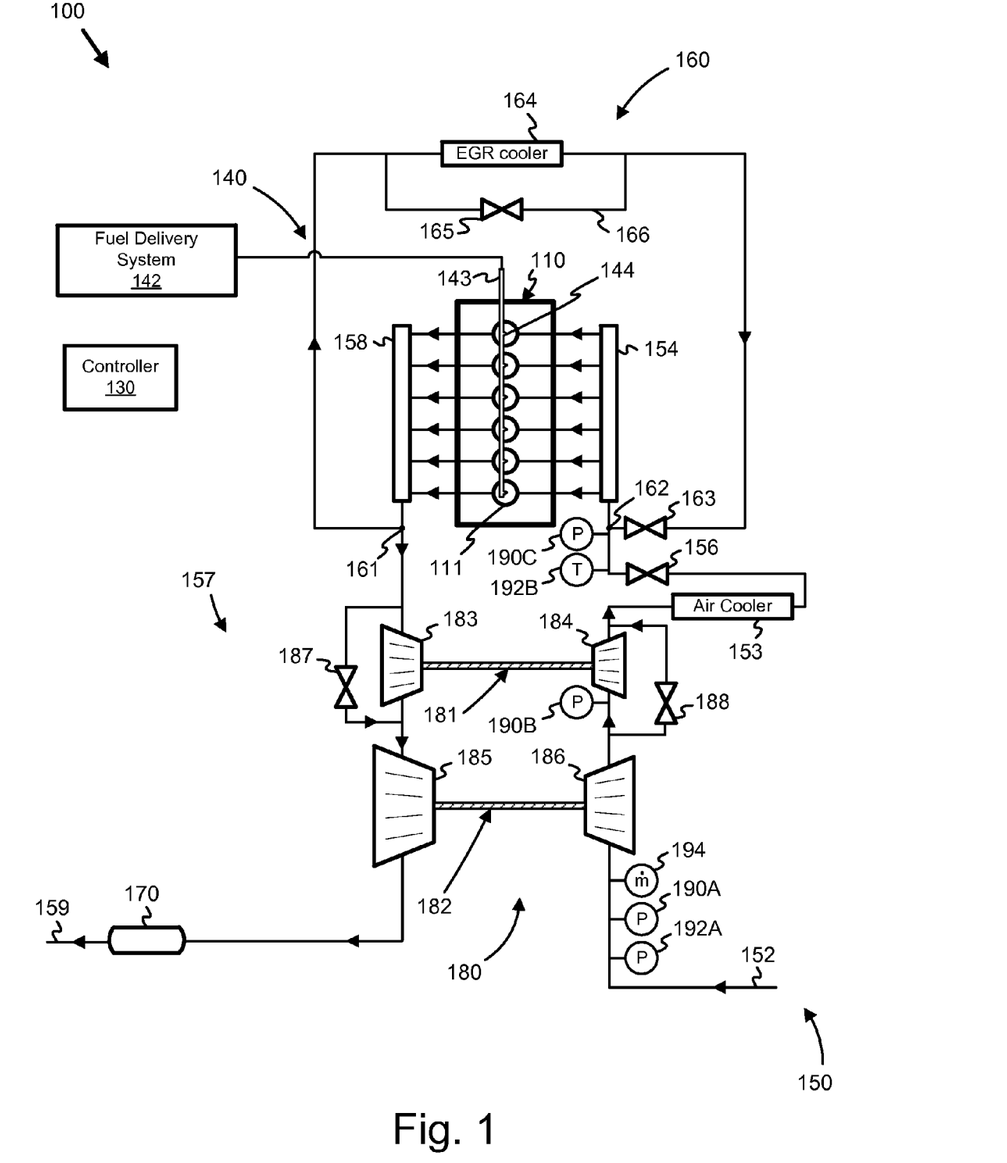
FIG. 1 is a schematic block diagram of an engine system according to one representative embodiment.

FIG. 1 depicts one exemplary embodiment of an internal combustion engine system 100. As shown, the engine system 100 includes a diesel internal combustion engine 110, a controller 130, fuel injection system 140, air delivery system 150, exhaust system 157, EGR system 160, exhaust aftertreatment system 170, and turbocharger system 180.

The engine 110 includes several combustion chambers 111 in which combustion events take place. The fuel driving the combustion events is injected into the combustion chambers 111 by the fuel injection system 140. The fuel injection system 140 includes a fuel delivery system 142, at least one fuel rail 143, and a plurality of fuel injectors 144. The fuel delivery system 142 can include any of various components for delivering fuel to the fuel rail 143. Generally, the fuel delivery system 142 includes a fuel source in fuel-transmitting communication with the fuel rail 143 via a fuel-regulating pump. The controller 130 can be electrically connected to the fuel-regulating pump to regulate the amount of fuel introduced to the fuel rail 143 and subsequently injected into the combustion chambers 111.

The air facilitating the combustion event is introduced into the combustion chambers 111 by the air delivery system 150. The air delivery system 150 includes an air inlet 152 and an intake manifold 154. In one embodiment, the air inlet 152 is vented to the atmosphere, enabling air to enter the engine system 100 and eventually flow into the combustion chambers 111. The air inlet 152 is coupled to an inlet of the intake manifold 154. The intake manifold 154 includes an outlet operatively coupled to the combustion chambers 111 of the engine 110. Within the combustion chambers 111, compressed air from the atmosphere is combined with fuel to power the engine 110. The amount, e.g., volumetric/mass flow rate, of air entering the combustion chambers 111 is at least partially regulated by an intake throttle 156 intermediate the air inlet 152 and the inlet of the intake manifold 154. In certain instances, the controller 130 is in electrical signal communication with the intake throttle 156 to control the position of the intake throttle and thus the flow rate of air into the compression chambers 111. In certain implementations, the air delivery system 150 includes an air cooler 153 intermediate the air inlet 152 and intake throttle 156 that is operable to decrease the temperature of air flowing through the cooler.

The exhaust system 157 includes an exhaust manifold 158 and an exhaust outlet 159. Combustion of the fuel produces exhaust gas that is operatively vented to the exhaust manifold 158. From the exhaust manifold 116, at least a portion of the exhaust gas may be expelled to the atmosphere via the exhaust outlet 159.

The EGR system 160 includes an EGR inlet 161 and EGR outlet 162. The EGR inlet 161 is coupled to the exhaust system 157 at a location intermediate the exhaust manifold 158 and the exhaust outlet 159, and the EGR outlet is coupled to the air delivery system 150 at a location intermediate the air intake manifold 154 and air intake throttle 156. Some amount of the exhaust gas exiting the exhaust manifold 158 may be re-circulated to the engine 110 via the EGR system 160, according to a proportion set by the controller 130. The amount of EGR gas re-circulated into the engine 110 is regulated by an EGR valve 163 in electrical communication with the controller 130. In certain embodiments, the EGR system 160 includes an EGR cooler 164 configured to cool the EGR gas to facilitate an increased engine air inlet density. In one embodiment, an EGR cooler bypass valve 165 is operable to divert EGR gas around the EGR cooler 164 via an EGR bypass line 166. The EGR gas is combined with the fresh air from the air delivery system 150 and the EGR gas and fresh air mixture is introduced into the combustion chambers 111.

The portion of the exhaust gas not recirculated through the EGR system 160 is introduced into the exhaust aftertreatment system 170. The exhaust aftertreatment system 170 can include any of various exhaust emissions reduction devices, such as, for example, a diesel oxidation catalyst, a particulate matter filter, an SCR system, and an ammonia oxidation catalyst.

Prior to entering the exhaust gas aftertreatment system 170, the exhaust gas not being recirculated through the EGR system 160 passes through the turbocharger system 180. As shown, the turbocharger system 180 is a sequential two-stage turbocharger system. The turbocharger system 180 includes a small, high-pressure (HP) turbocharger 181 in series with a large low-pressure (LP) turbocharger 182. Each turbocharger includes a turbine coupled to a compressor via a shaft. For example, the HP turbocharger 181 includes an HP turbine 183 coupled to an HP compressor 184, and the LP turbocharger 182 includes an LP turbine 185 coupled to an LP compressor 186. The turbines 183, 185 are driven, e.g., rotated, by the exhaust gas passing through the turbines and contacting the turbine blades. As the turbines 183, 185 rotate, the compressors 184, 186 correspondingly rotate. As is commonly known in the art, fresh air passing through the rotating compressors is compressed to increase the density of the air exiting the compressors. The pressure difference between atmospheric pressure and the pressure of the compressed or charged air is defined herein as "boost pressure."

As shown in FIG. 1, the HP turbine 183 is capable of receiving and being driven by exhaust from the exhaust manifold 158. In certain applications, the exhaust exiting the exhaust manifold 158 can be diverted about the HP turbine 183 by actuation of a HP turbine bypass valve 187 controlled by the controller 130. Exhaust exiting the HP turbine 183, or redirected passed the HP turbine, is received by and drives the LP turbine 185. Similar to the exhaust gas path, intake air from the air inlet 152 is first received in and compressed by the LP compressor 186. Compressed air exiting the LP compressor 186 can be received and further compressed by the HP compressor 184 or redirected passed the HP compressor by actuation of an HP compressor bypass valve 188 controlled by the controller 130. Compressed air exiting the HP compressor 186 or redirected around the HP compressor, then passes through and is cooled by the air cooler 153. The cooled, compressed charge air then enters the intake manifold at a flow rate regulated by the intake throttle 156.

The HP and LP turbochargers 181, 182 work together to efficiently and effectively increase the pressure of the intake air to a desired boost pressure. In a preferred embodiment, the engine operating range is partitioned into three general operating ranges: a low RPM operating range, a medium RPM operating range, and a high RPM operating range. During operation in the low RPM operating range, the LP turbine bypass valve 187 is substantially closed such that substantially all the exhaust flowing through the HP turbine 183 flows through the LP turbine 182. Because the exhaust flow rate is relatively low in the low RPM operating range and the HP turbine 183 require less exhaust flow rate for operation, the HP turbocharger 181 performs approximately all of the air compression work when operating in the low RPM operating range. During operation in the medium RPM operating range, the HP turbine bypass valve 187 is partially opened (and adjustable into any of various partially opened positions) to allow some exhaust gas to bypass the HP turbine 183 and flow directly into the LP turbine 185. Because the exhaust flow rate during the medium RPM operating range is higher than during the low RPM operating range, some air compression work is performed by the LP turbocharger 182 in addition to the HP turbocharger 181. During operation in the high RPM operating range, the HP turbine bypass valve 187 is fully open such that substantially all of the exhaust gas is bypassing the HP turbine 183 and the LP turbocharger 182 is performing substantially all of the air compression work.

Regarding the flow paths of intake air during low, medium, and high RPM operating ranges, the HP compressor bypass valve 188 corresponds to the position of the HP turbine bypass valve 187 to control the flow of charge air into HP compressor 184. For example, during operation in the low RPM operating range, the HP compressor bypass valve 188 is closed to allow substantially all of the charge air to enter the HP compressor 184. During operation in the medium RPM operating range, the HP compressor bypass valve 188 is partially open (and adjustable into any of various partially opened positions) to allow a portion of the charge air to enter the HP compressor 184. Finally, during operation in the high RPM operating range, the HP compressor bypass valve 188 is fully open to allow substantially all of the charge air to bypass the HP compressor 184.

The engine system 100 further includes multiple physical sensors positioned at various locations within the engine system and in communication with the controller 130 to monitor operating conditions. For example, the engine system 100 can include air pressure sensors 190A-C, air temperature sensors 192A-B, and air mass flow rate sensor 194. The LP compressor inlet air pressure sensor 190A, LP compressor inlet air temperature sensor 192A, and air mass flow rate 194 are positioned upstream of the LP compressor 186 between the LP compressor and the air inlet 152. The inter-stage air pressure sensor 190B is positioned intermediate the HP compressor 184 and the LP compressor 186, i.e., upstream of the HP compressor and downstream of the LP compressor. The air manifold inlet air pressure sensor 190C and air manifold inlet air temperature sensor 192B are positioned downstream of the air intake throttle 156, e.g., coupled to the air intake manifold 154 in one instance. Although not specifically shown, the engine system can include other sensors, such as, fuel sensors, oxygen sensors, exhaust emissions sensors, etc.

Although physical turbine speed sensors can be used to sense the speeds of the respective turbines 183, 185, preferably, the speeds of the turbines are determined using a virtual turbine speed sensor for achieving at least the advantages described above. The virtual turbine speed sensor for at least one of the HP and LP turbines 183, 185 can be incorporated into the controller 130. Accordingly, in one exemplary embodiment, the controller 130 estimates speed of one or more turbines based at least partially on compressor upstream and downstream conditions, predetermined compressor operating maps, exhaust system pipe losses, and isentropic principles. For example, referring to FIG. 2, the controller 130 includes a sensor input module 200, pipe loss module 210, compressor efficiency module 220, inter-stage exhaust temperature module, and turbine speed module 240 that cooperatively provide a turbine speed estimate.

Figure 2:
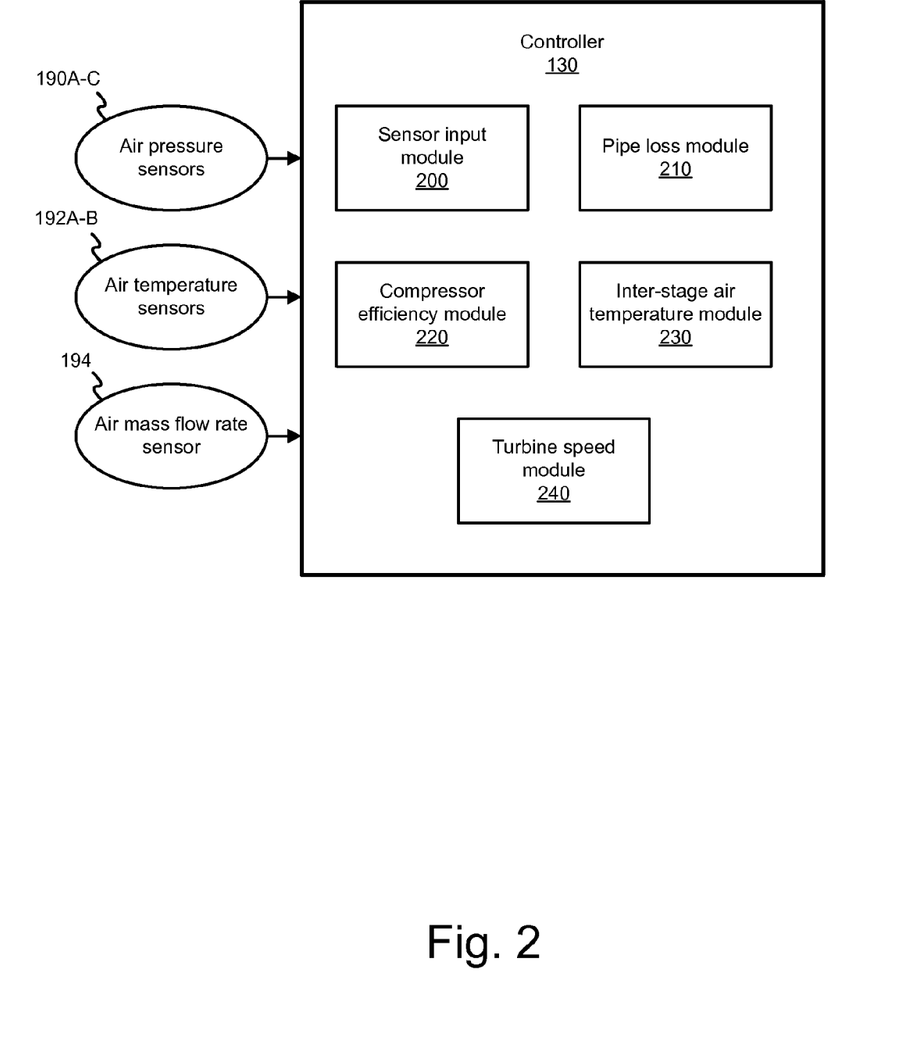
FIG. 2 is a schematic block diagram of a controller of the engine system of FIG. 1 according to one representative embodiment.

The sensor input module 200 receives input signals from various sensors of the engine system 100 and, based on the input signals, interprets various operating conditions of the system corresponding to the sensors. More specifically, the sensor input module 200 interprets the LP compressor inlet air pressure ($P_1$), the inter-stage air pressure ($P_2$), and the air intake manifold inlet air pressure ($P_3$) based on input signals received from the air pressure sensors 190A-C, respectively. Further, the sensor input module 200 interprets the LP compressor inlet air temperature ($T_1$) and the air intake manifold inlet temperature ($T_3$) based on input signals received from the air temperature sensors 192A-B, respectively. The sensor input module 200 also interprets the air mass flow rate ($\dot{m}$) through the compressors 184, 186 based on an input signal received from the air mass flow rate sensor 194.

In certain implementations, the sensor input module 200 includes signal error correction data for one or more of the various sensors of the system. The signal error correction data can be predetermined from empirically conducted experiments and accessible from stored look-up tables. In addition to correcting noise and other signal errors, the signal error correction data can be used to determine a resolution of the virtual sensor. For example, conventional statistical methods for error analysis can be used for determining the resolution of the virtual sensor. Additionally, or alternatively, a reduction in the overall uncertainty of the virtual turbine speed sensor output can be determined by taking multiple measurements of observed engine property phenomena and analyzing them according to conventional computational model approaches, such as Kalman observer computational models. For example, at least two observations drawn from a normal distribution can be merged into an improved estimate by multiplying the distributions. Because the result of multiplying two normal, e.g., Gaussian, distributions together is another Gaussian distribution, e.g., multivariate Gaussian distribution, the multiplication operation is symmetric, associated, and usable to combine any number of distributions in any order. Generally, a Gaussian distribution is based on the standards distributions, a covariance matrix, and the mean of the distributions.

Figure 3:
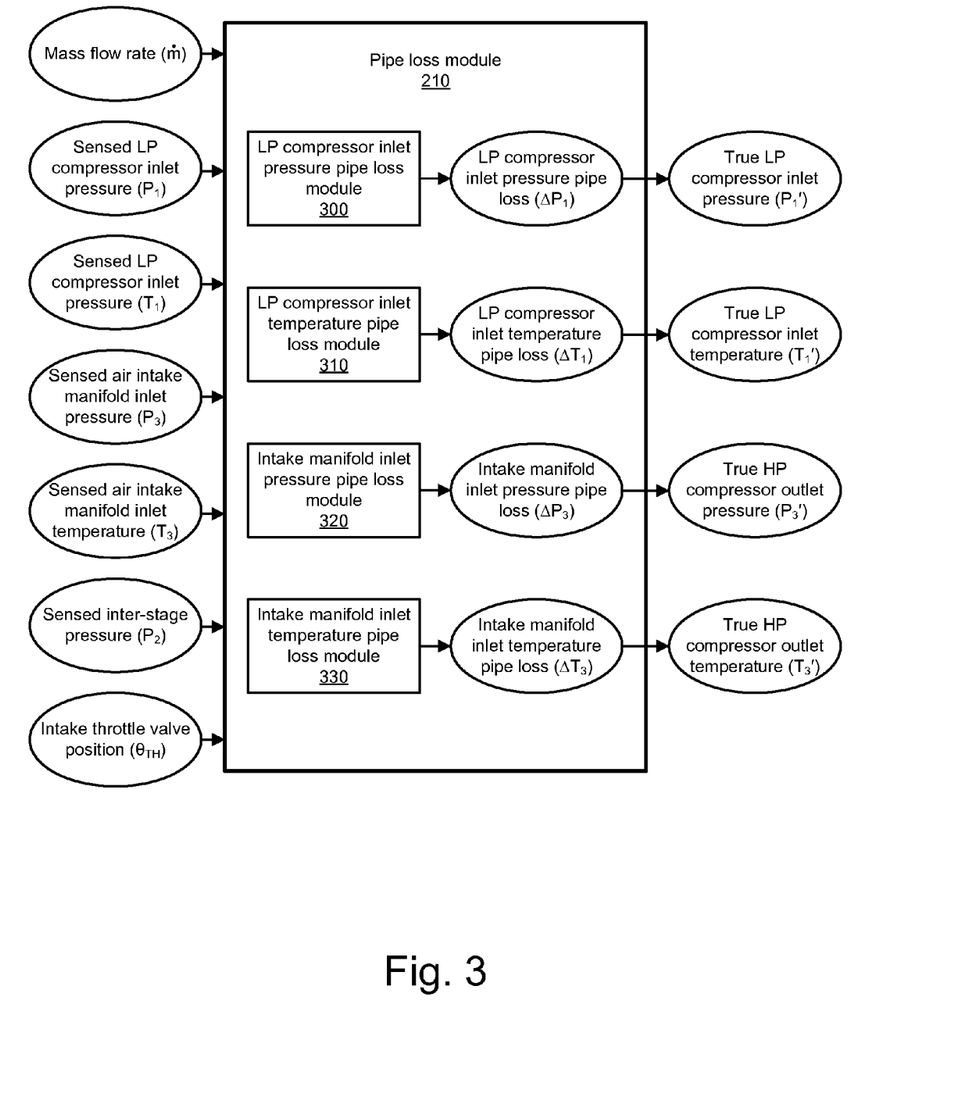
FIG. 3 is a schematic block diagram of a pipe loss module of the controller of FIG. 2 according to one representative embodiment.

Referring to FIG. 3, the pipe loss module 210 is configured to estimate true air pressure and temperature operating characteristics at the inlets and outlets of the respective HP and LP compressors 184, 186 by accounting for air pressure and temperature changes due to pipe losses after or before the operating characteristics are sensed. Often, air pressure and temperature sensors for determining HP and LP compressor inlet and outlet conditions are not located at the inlets and outlets of the HP and LP compressor, e.g., are located some distance away from the HP and LP inlets and outlets. Moreover, the air may experience pressure and/or temperature losses between passing the sensors and entering or exiting the HP and LP compressors. Generally, air pressure pipe loss ($\Delta P$) between two locations (e.g., a sensed location and a desired location) can be modeled according to the following:

$$\Delta P = K \frac{\rho}{2A^2} q|q| = K \frac{\rho}{2} U^2 = K \frac{\rho}{2} \left( \frac{\dot{m}}{\rho A} \right)^2 = K \frac{\dot{m}^2}{2A^2 \rho} \tag{1}$$

where K is a constant of proportionality, $\rho$ is the density of air, q is the air flow rate, A is the air flow area, U is the air flow velocity, and $\dot{m}$ is the air mass flow rate. The air temperature pipe loss ($\Delta T$) can then be modeled using Equation 1 and the adiabatic ideal gas law as follows:

$$\frac{P}{P_t} = \left( \frac{T}{T_t} \right)^{\frac{\gamma}{\gamma-1}} \tag{2}$$

where P is the local static pressure, $P_t$ is the stagnation pressure, T is the local static temperature, $T_t$ is the stagnation temperature, and $\gamma$ is the heat capacity ratio of air. Once pressure pipe loss ($\Delta P$) and temperature pipe loss ($\Delta T$) are determined, the true pressure (P') and true temperature (T') at a desired location are determined through application of the following equations:

$$P' = P + \Delta P \tag{3}$$

$$T' = T + \Delta T \tag{4}$$

where P is the sensed pressure at a location away from the desired location and T is the sensed temperature at a location away from the desired location.

The pipe loss module 210 includes an LP compressor inlet pressure pipe loss module 300 and an LP compressor inlet temperature pipe loss module 310. Based on Equation 1 above, the LP compressor inlet pressure pipe loss module 300 estimates the LP compressor inlet air pressure pipe loss ($\Delta P_1$). In many applications, the constant of proportionality is approximately zero for air flow upstream of the LP compressor 186 inlet. Accordingly, the estimated LP compressor inlet air pressure pipe loss ($\Delta P_1$) is approximately zero. Moreover, because there are effectively no losses and changes to pressure upstream of the LP compressor 186 inlet, and assuming adiabatic conditions are present, the estimated LP compressor inlet air pressure pipe loss ($\Delta T_1$) also is approximately zero. Where the LP compressor inlet air pressure and temperature pipe losses ($\Delta P_1$, $\Delta T_1$) are effectively zero, the LP compressor inlet pressure pipe loss modules 300 estimates a true LP compressor inlet air pressure ($P_1'$) equal to the sensed LP compressor inlet air pressure ($P_1$) and the LP compressor inlet temperature pipe loss module 310 estimates a true LP compressor inlet air temperature ($T_1'$) equal to the sensed LP compressor inlet air temperature ($T_1$).

For the illustrated embodiment having air pressure sensor 190C and air temperature sensor 192B positioned at the intake manifold inlet or in the intake manifold, the difference in the sensed air intake manifold inlet air pressure ($P_3$) and temperature ($T_3$) and the true air pressure and temperature at the HP compressor 184 outlet ($P_3'$, $T_3'$) due to pipe losses can be significant. These pipe losses are mainly attributed to the air cooler 153 when the air intake throttle 156 valve position ($\theta_{ITV}$) is below a predetermined threshold angle ($\theta_{ITV,TH}$), e.g., approximately 60°, and attributed to the position of the air intake throttle valve when the valve position is above the predetermined angle. Accordingly, the intake manifold inlet pressure pipe loss module 320 can use different approaches to modeling the true air pressure and temperature at the HP compressor 184 outlet ($P_3'$, $T_3'$) depending on the position of the air intake throttle 156 valve ($\theta_{ITV}$) and a pipe loss valve threshold angle ($\theta_{ITV,TH}$) of the intake throttle 156. The predetermined threshold angle is the empirically determined intake throttle 156 valve angle at which the relationship between a sensed air intake manifold inlet air pressure ($P_3$) and a sensed HP compressor outlet air pressure ($P_3'$) transitions from approximately linear to approximately non-linear.

For air intake throttle 156 valve angles ($\theta_{ITV}$) below the pipe loss valve threshold angle ($\theta_{ITV,TH}$), the relationship between the sensed air intake manifold inlet pressure ($P_3$) and the true HP compressor outlet pressure ($P_3'$) is approximately linear. Accordingly, the intake manifold inlet air pressure pipe loss ($\Delta P_3$) can be modeled by the intake manifold inlet pressure pipe loss module 320 as a function of the intake manifold inlet air gauge pressure ($P_3^{gauge}$), air density ($\rho$), air flow velocity (U), air mass flow rate ($\dot{m}$), length of air flow (d), and total air flow area (A) as incorporated into the following equation:

$$\Delta P_3 = K_1 P_3^{gauge} + K_2 \rho U^2 \quad (5)$$

where $K_1$ is a first empirically determined constant and $K_2$ is a second empirically determined constant. The first and second empirically determined constants $K_1$ and $K_2$ are based on the measured data using a regression analysis. The linear parameterization associated with the regression analysis is based on a modification of Equation 1 to allow for the impact of local static pressure. Additional regression fits may be used to determine better linear formulations. The first and second empirically determined constants can be calibrated using a best fit slope analysis comparing a measured value for the true HP compressor outlet air pressure ($P_3'$) with the modeled value for the true HP compressor outlet air pressure. In some implementations, the constant $K_1$ is between about −0.075 and zero, and the constant $K_2$ multiplied by the air density ($\rho$) is between about zero and about 125. In one specific implementation, the constant $K_1$ is equal to approximately zero and the constant $K_2$ multiplied by the air density ($\rho$) is equal to approximately 50.

Once the intake manifold inlet pressure pipe loss ($\Delta P_3$) is obtained, the intake manifold inlet pressure pipe loss module 320 predicts the true HP compressor outlet air pressure ($P_3'$) based on Equation 3 above. Based on the predicted intake manifold inlet pressure pipe loss ($\Delta P_3$) and true HP compressor outlet air pressure ($P_3'$), the predicted intake manifold inlet temperature pipe loss ($\Delta T_3$) and true HP compressor outlet air temperature ($T_3'$) can be obtained according to Equation 3 above or through application of Equation 14 below.

For air intake throttle 156 valve angles ($\theta_{ITV}$) above the pipe loss threshold angle ($\theta_{ITV,TH}$), e.g., above approximately 60° in some implementations, the true HP compressor outlet air pressure ($P_3'$) can be predicted using a predetermined look-up table approach and/or a system modeling approach. With either a look-up table approach or system modeling approach, the intake manifold inlet pressure pipe loss module 320 can predict the true HP compressor outlet air pressure ($P_3'$) directly without the intermediate step of determining the intake manifold inlet pressure pipe loss ($\Delta P_3$).

Figure 4A:
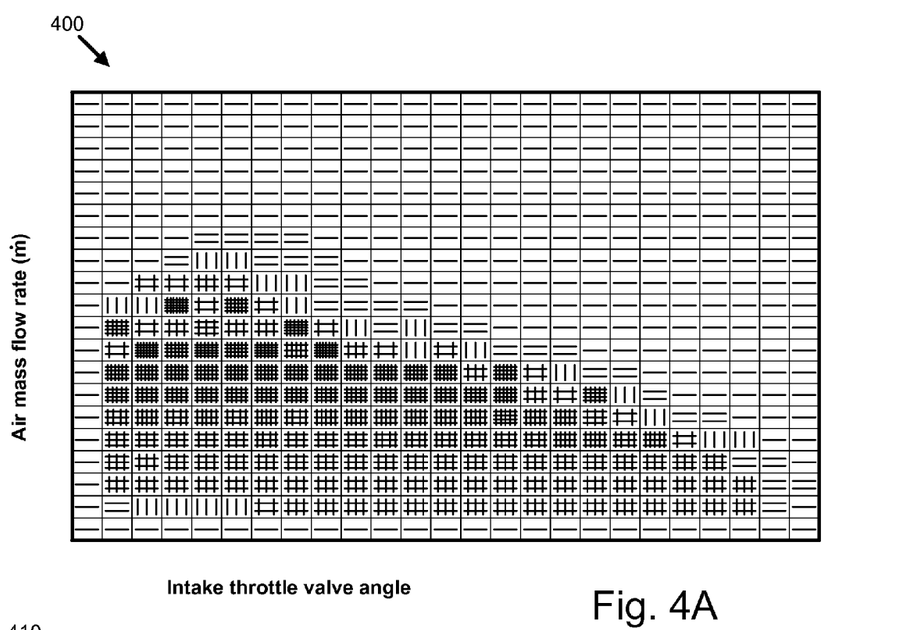
FIG. 4A is a look-up table comparing predetermined high pressure compressor outlet air pressure temperatures with intake throttle valve angles and air mass flow rates according to one representative embodiment.
Figure 4B:
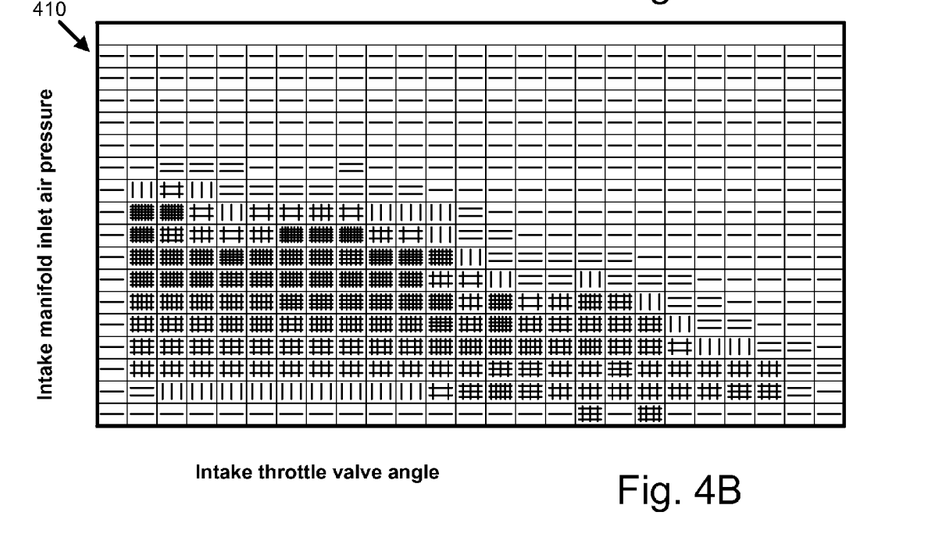
FIG. 4B is a look-up table comparing predetermined high pressure compressor outlet air pressure temperatures with intake throttle valve angles and intake manifold inlet air pressure according to one representative embodiment.

According to one embodiment, in a first look-up table approach, the true HP compressor outlet air pressure ($P_3'$) can be determined by knowing the air mass flow rate and air intake throttle 156 valve position, and using a table (e.g., table 400 of FIG. 4A) containing empirically obtained values for the HP compressor outlet air pressure (using a pressure sensor at the HP compressor 184 outlet) compared to air mass flow rates ($\dot{m}$) and air intake throttle 156 valve angles. According to another embodiment, in a second look-up table approach, the true HP compressor outlet air pressure ($P_3'$) can be determined by knowing the air mass flow rate ($\dot{m}$) and air intake throttle 156 valve position ($\theta_{ITV}$), and using a table (e.g., table 410 of FIG. 4B) containing empirically obtained values for the HP compressor outlet air pressure (again, using a pressure sensor at the HP compressor 184 outlet) compared to air intake manifold pressures ($P_3$) and air intake throttle 156 valve angles.

In one embodiment where the air intake throttle 156 valve angle ($\theta_{ITV}$) is above the pipe loss threshold angle ($\theta_{ITV,TH}$), a system modeling approach is used to predict the true HP compressor outlet air pressures ($P_3'$). The system modeling approach attempts to model the air flow characteristics of air flowing between the HP compressor 184 outlet and the air intake manifold 154 inlet. Assuming isentropic and calorically perfect gas conditions, no shock waves, and flow through the intake throttle 156 is similar to flow through a converging-diverging nozzle, the intake manifold inlet pressure pipe loss ($\Delta P_3$) can be effectively modeled based at least partially isentropic calorically perfect equations. For example, assuming no shock and a Mach number approximately equal to zero, the following equations are used in the system modeling approach:

$$\frac{P_3}{P_t} = \frac{P_3}{P_3'} = \left(1 + \frac{\gamma-1}{2} M_3^2\right)^{\frac{-\gamma}{\gamma-1}} \quad (6)$$

$$M_3 = \left(\frac{2}{\gamma-1}\left(\left(\frac{P_3}{P_3'}\right)^{\frac{-\gamma}{\gamma-1}} - 1\right)\right)^{\frac{1}{2}} \quad (7)$$

$$C_3 = \sqrt{\gamma R T_3} \quad (8)$$

$$v_3 = M_3 C_3 \quad (9)$$

$$\rho = \frac{P_3}{R T_3} \quad (10)$$

$$A_3 = \frac{\dot{m}}{\rho_3 v_3}. \quad (11)$$

By combining Equations 7, 8, 9, 10, and 11, and solving for the mass flow rate of air $\dot{m}$, the following equation is obtained:

$$\dot{m} = \frac{P_3 A_3}{\sqrt{R T_3}} \left\{\frac{2\gamma}{\gamma-1}\left(\left(\frac{P_3}{P_3'}\right)^{\frac{1-\gamma}{\gamma}} - 1\right)\right\}^{\frac{1}{2}} \quad (12)$$

where R is the gas constant of air. The air flow area at the intake throttle outlet ($A_3$) can be obtained from a predetermined look-up table containing empirically obtained air flow areas compared to one or more other measurable quantities. For example, in one implementation, the intake manifold inlet pressure pipe loss module 320 can include a look-up table containing predetermined air flow areas ($A_3$) as a function of intake throttle 156 valve positions. Alternatively, in other implementations, the intake manifold inlet pressure pipe loss module 320 can include a look-up table containing predetermined air flow areas ($A_3$) as a function of intake throttle 156 valve positions and air mass flow rates. The value for air flow area ($A_3$) obtained from a desired one of the above look-up tables is substituted into Equation 12. The predicted true HP compressor outlet air pressure ($P'_3$) can then be obtained from Equation 12 by substituting measured values for mass flow rate ($\dot{m}$), air intake manifold inlet pressure ($P_3$), air intake manifold temperature ($T_3$), and known values for the gas constant of air (R) and the heat capacity ratio of air ($\gamma$), then solving for the true HP compressor outlet pressure.

Once the true HP compressor outlet air pressure ($P_3'$) is predicted, its value can be used to determine the true HP compressor outlet air temperature ($T_3'$) according to Equation 3 above.

In certain implementations, additional accuracy in the prediction of the true HP compressor outlet pressure ($P'_3$) can be achieved by obtaining the intake throttle outlet air flow area ($A_3$) as a function of regression parameters. The regression parameters can include, but are not limited to, the air intake manifold inlet pressure ($P_3$), the air intake manifold inlet temperature ($T_3$), the air mass flow rate ($\dot{m}$), the density of air at the air intake manifold ($\rho_3$), the speed of sound at the air intake manifold ($C_3$), and the intake throttle 156 valve angle ($\theta_{ITV}$). The regression analysis includes logging regression parameter data on an operating engine and simultaneously determining a best fit linear equation and best fit coefficients based on combinations of the regression parameters. Based on desired thresholds, regression parameter combinations that do not have a significant impact on the outlet air flow area ($A_3$) can be eliminated.

Although not shown, the engine system 100 can include pressure and temperature sensors positioned at the outlet of the HP compressor 184 to sense the pressure and temperature of the air exiting the HP compressor such that pipe losses are negligible.

Figure 5:
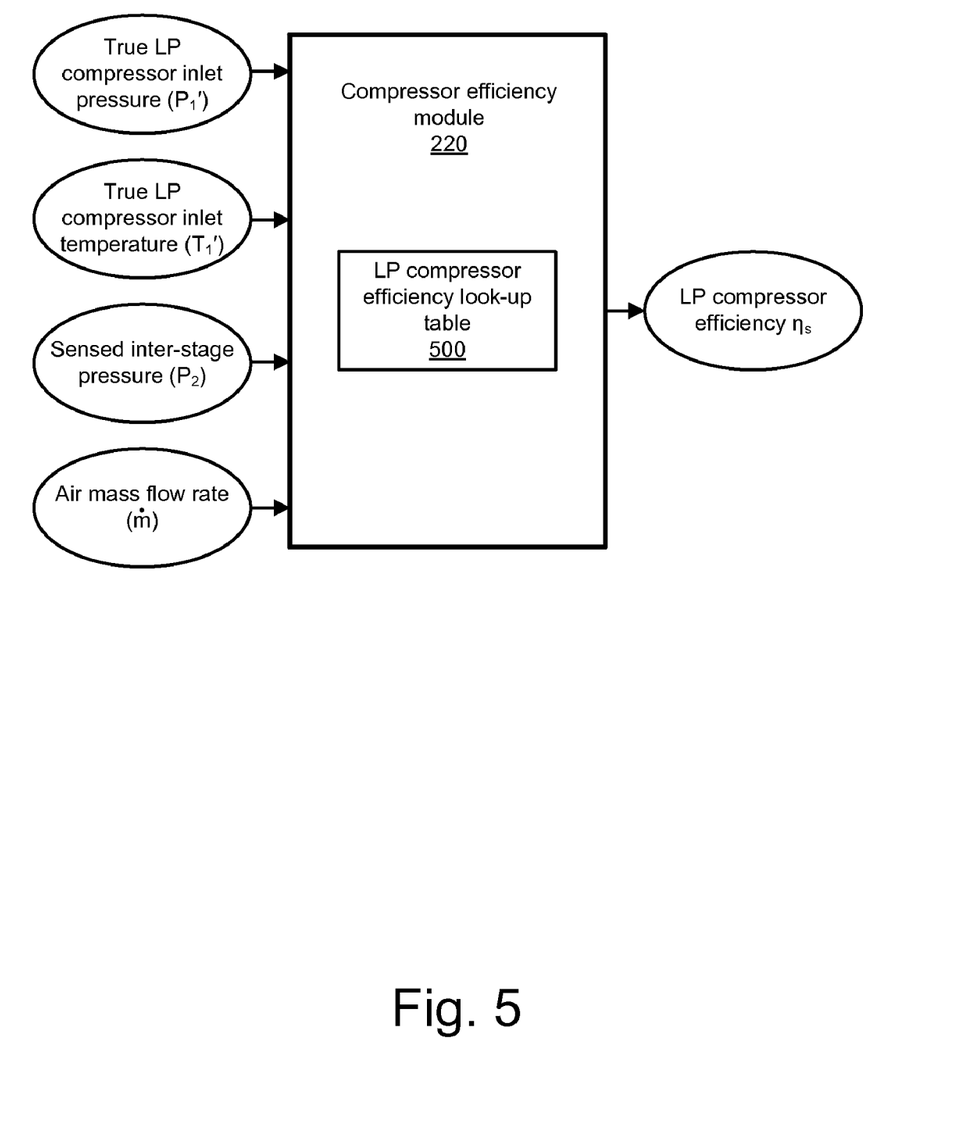
FIG. 5 is a compressor efficiency module of the controller of FIG. 2 according to one representative embodiment.

Referring to FIG. 5, the compressor efficiency module 220 predicts an LP compressor efficiency $\eta_{LP}$. The compressor efficiency module 220 includes an LP compressor efficiency look-up table 500 that includes predetermined, empirically-obtained LP compressor efficiency values versus corrected LP inlet air mass flows ($\dot{m}_{corrected,LP}$) and LP pressure ratios ($P_2/P'_1$). The corrected air mass flow ($\dot{m}_{corrected}$) into a compressor C can be defined according to the following equation:

$$\dot{m}_{corrected,C} = \frac{\dot{m}\sqrt{T_{in}}}{P_{in}} \quad (13)$$

where $\dot{m}$ is the sensed air mass flow rate through the multi-stage turbocharger system 180, $T_{in}$ is the compressor C inlet air temperature, and $P_{in}$ is the compressor C inlet air pressure. Based on the true LP compressor inlet air pressure ($P'_1$) and true LP compressor inlet air temperature ($T'_1$) received from the pipe loss module 210, and the sensed inter-stage air pressure ($P_2$) and air mass flow rate ($\dot{m}$) received from the sensor input module 200, the compressor efficiency module 220 determines and uses the LP inlet air mass flow ($\dot{m}_{corrected,LP}$) and LP air pressure ratio ($P_2/P'_1$) to obtain the LP compressor efficiency $\eta_{LP}$ from the LP compressor efficiency look-up table 500. Once the inter-stage air temperature ($T_2$) is predicted as will be described below, the HP compressor efficiency $\eta_{HP}$ can be determined using similar techniques if desired.

Figure 6:
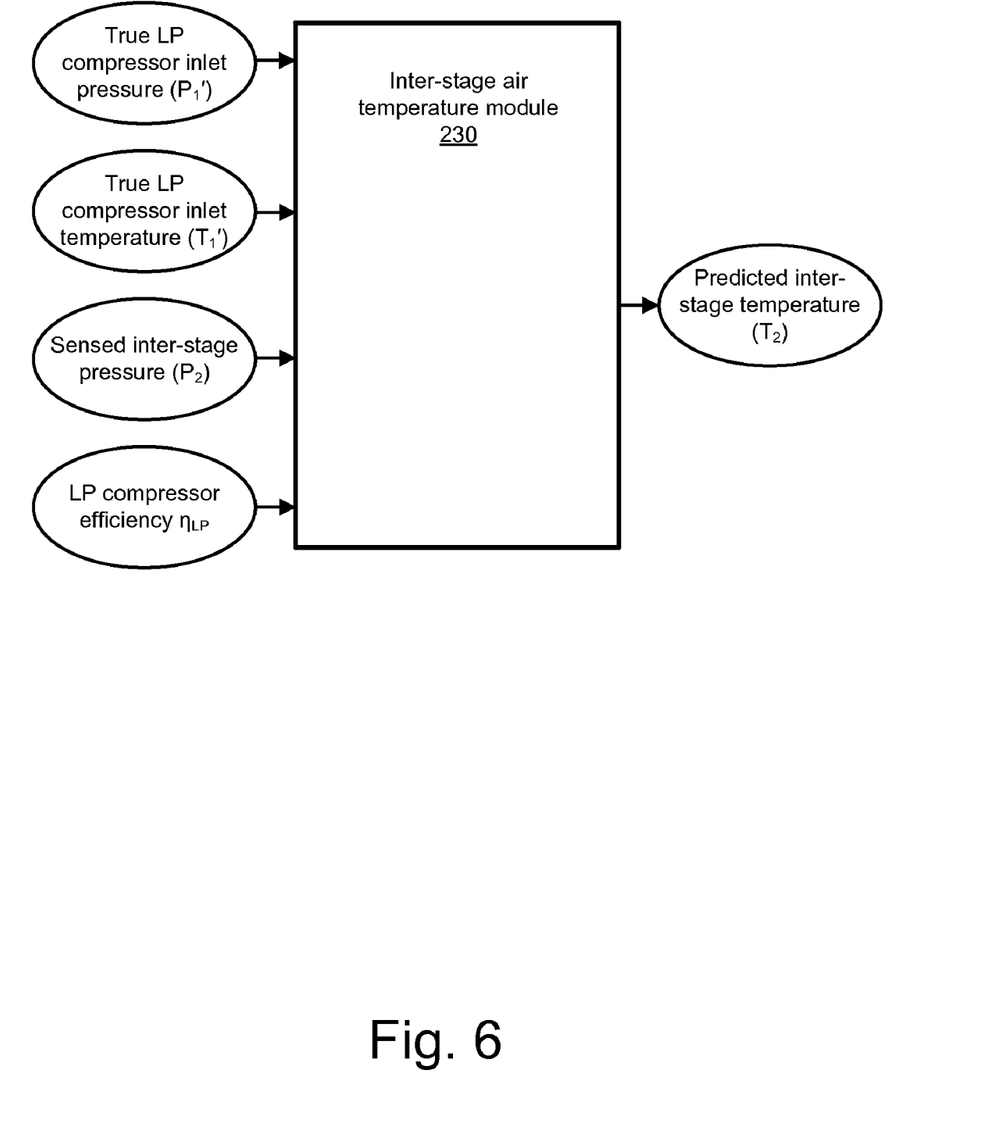
FIG. 6 is an inter-stage air temperature module of the controller of FIG. 2 according to one representative embodiment.

Referring to FIG. 6, the inter-stage air temperature module 230 acts as a virtual inter-stage air temperature sensor to predict an inter-stage air temperature ($T_2$). The inter-stage air temperature module 230 includes an algorithm corresponding to the following equation:

$$T_2 = \frac{T'_1}{\eta_{LP}}\left(\left(\frac{P_2}{P'_1}\right)^{\frac{\gamma-1}{\gamma}} - 1\right) + T'_1. \quad (14)$$

Based on the true LP compressor inlet air pressure ($P'_1$) and true LP compressor inlet air temperature ($T'_1$) received from the pipe loss module 210, the sensed inter-stage air pressure ($P_2$) received from the sensor input module 200, and the LP compressor efficiency $\eta_{LP}$ received from the compressor efficiency module 220, the inter-stage air temperature module 220 obtains the predicted inter-stage air temperature ($T_2$) from Equation 14. Alternatively, in some implementations, a physical temperature sensor can be positioned intermediate the HP and LP compressors 183, 185 to sense the inter-stage air temperature ($T_2$).

Figure 7:
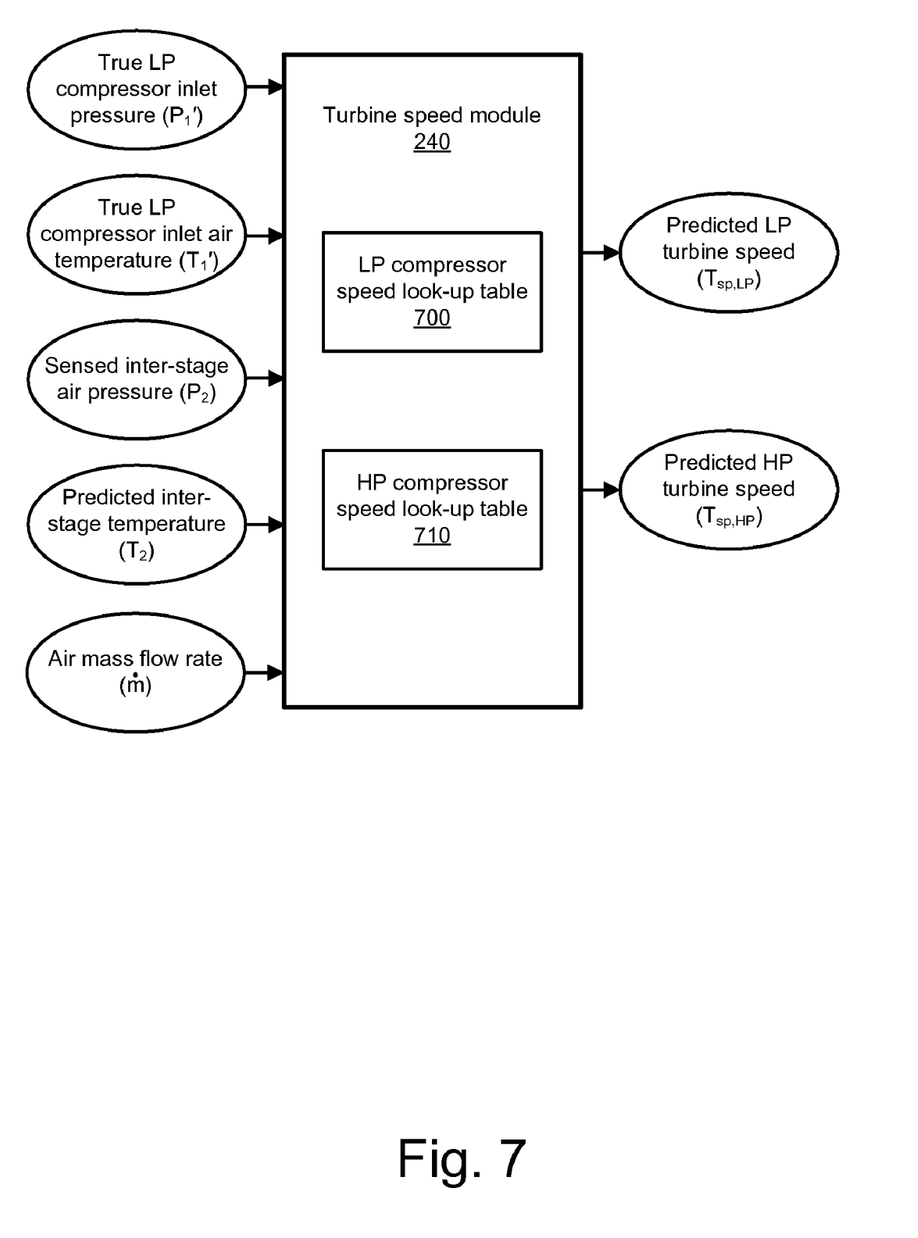
FIG. 7 is a turbine speed module of the controller of FIG. 2 according to one representative embodiment.

Referring now to FIG. 7, the turbine speed module 240 predicts an LP turbine speed ($T_{sp,LP}$) and an HP turbine speed ($T_{sp,HP}$). The turbine speed module 240 includes an LP compressor speed look-up table 700 and HP compressor speed look-up table 710 that each include predetermined, empirically-obtained LP compressor and HP compressor temperature-speed values 800, 810, respectively, versus corrected air mass flows ($\dot{m}_{corrected}$) into the respective compressors and pressure ratios across the respective compressors (see FIGS. 8A and 8B). Although, as illustrated, the LP compressor speed look-up table 700 and HP compressor speed look-up table 710 are separate, in certain implementations, the tables can be combined into one table.

Figure 8A:
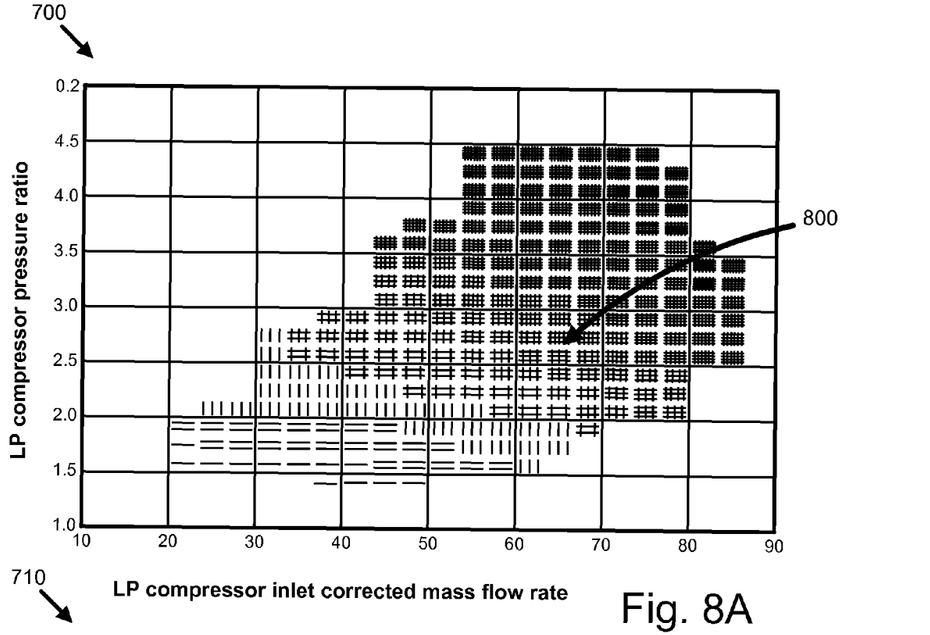
FIG. 8A is a look-up table comparing predetermined low pressure compressor/turbine speeds with low pressure compressor inlet corrected mass flow rates and low pressure compressor pressure ratios according to one representative embodiment.

Regarding the LP turbocharger 182, based on the LP compressor air pressure ratio ($P_2/P'_1$) and LP compressor corrected air mass flow ($\dot{m}_{corrected,LP}$) defined according to Equation 13, an LP compressor speed-temperature value $C_{sp,LP}/\sqrt{T'_1}$ can be obtained from the LP compressor speed look-up table 700. Because the true LP compressor inlet air temperature ($T'_1$) is known, the LP compressor speed ($C_{sp,LP}$) can be determined from the speed-temperature value $C_{sp,LP}/\sqrt{T'_1}$. Moreover, because the speed of a turbocharger compressor is necessarily the speed of the turbocharger turbine, the turbine speed module 240 sets the predicted LP turbine speed ($T_{sp,LP}$) equal to the predicted LP compressor speed ($C_{sp,LP}$).

Figure 8B:
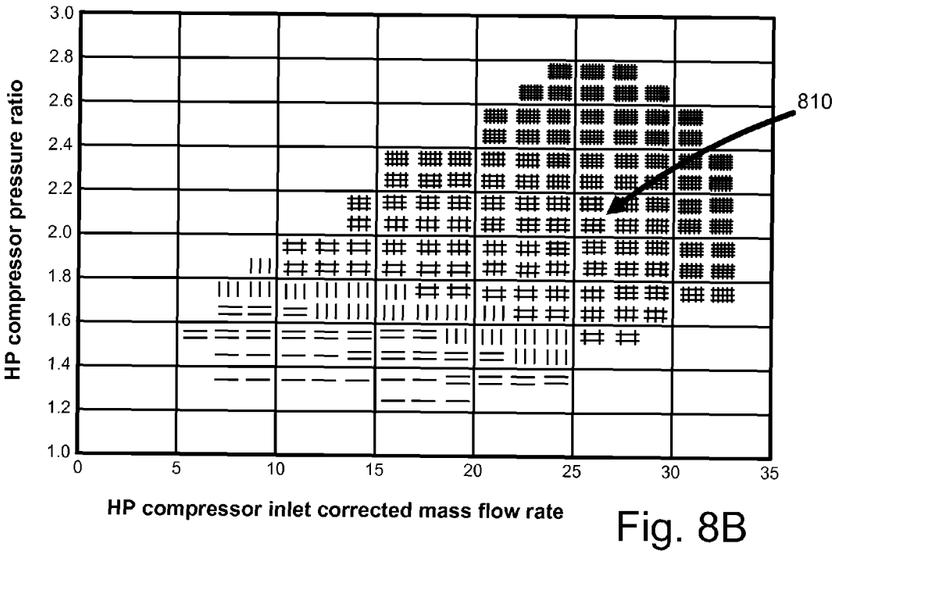
FIG. 8B is a look-up table comparing predetermined high pressure compressor/turbine speeds with high pressure compressor inlet corrected mass flow rates and high pressure compressor pressure ratios according to one representative embodiment.

Similar to determining the LP turbine speed of the LP turbocharger 182, the HP turbine speed ($T_{sp,HP}$) of the HP turbocharger 181 is determined based on an HP compressor pressure ratio ($P'_3/P_2$) and an HP compressor corrected air mass flow ($\dot{m}_{corrected,HP}$) defined according to Equation 13 (with $T_{in}$ equal to the predicted inter-stage air temperature ($T_2$) and $P_{in}$ equal to the sensed inter-stage air pressure ($P_2$)). With the HP compressor air pressure ratio ($P'_3/P_2$) and an HP compressor corrected air mass flow ($\dot{m}_{corrected,HP}$) known, an HP compressor speed-temperature value $C_{sp,HP}/\sqrt{T_2}$ can be obtained from the HP compressor speed look-up table 710. Because the inter-stage air temperature ($T_2$) is predicted by the inter-stage air temperature module 230, the HP compressor speed ($C_{sp,HP}$) can be determined from the HP compressor speed-temperature value $C_{sp,HP}/\sqrt{T_2}$. Following the same turbocharger principles discussed above, the turbine speed module 240 sets the predicted HP turbine speed ($T_{sp,HP}$) equal to the HP compressor speed ($C_{sp,HP}$).

Although the true LP compressor inlet air pressure and temperature ($P'_1$, $T'_1$) and true HP compressor outlet air pressure ($P'_3$) are used for determining the predicted LP and HP turbine speeds ($T_{sp,LP}$, $T_{sp,HP}$) in the above embodiments, in other embodiments, the sensed LP compressor inlet air pressure and temperature ($P_1$, $T_1$) and sensed HP compressor outlet air pressure ($P_3$) are used.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 9:
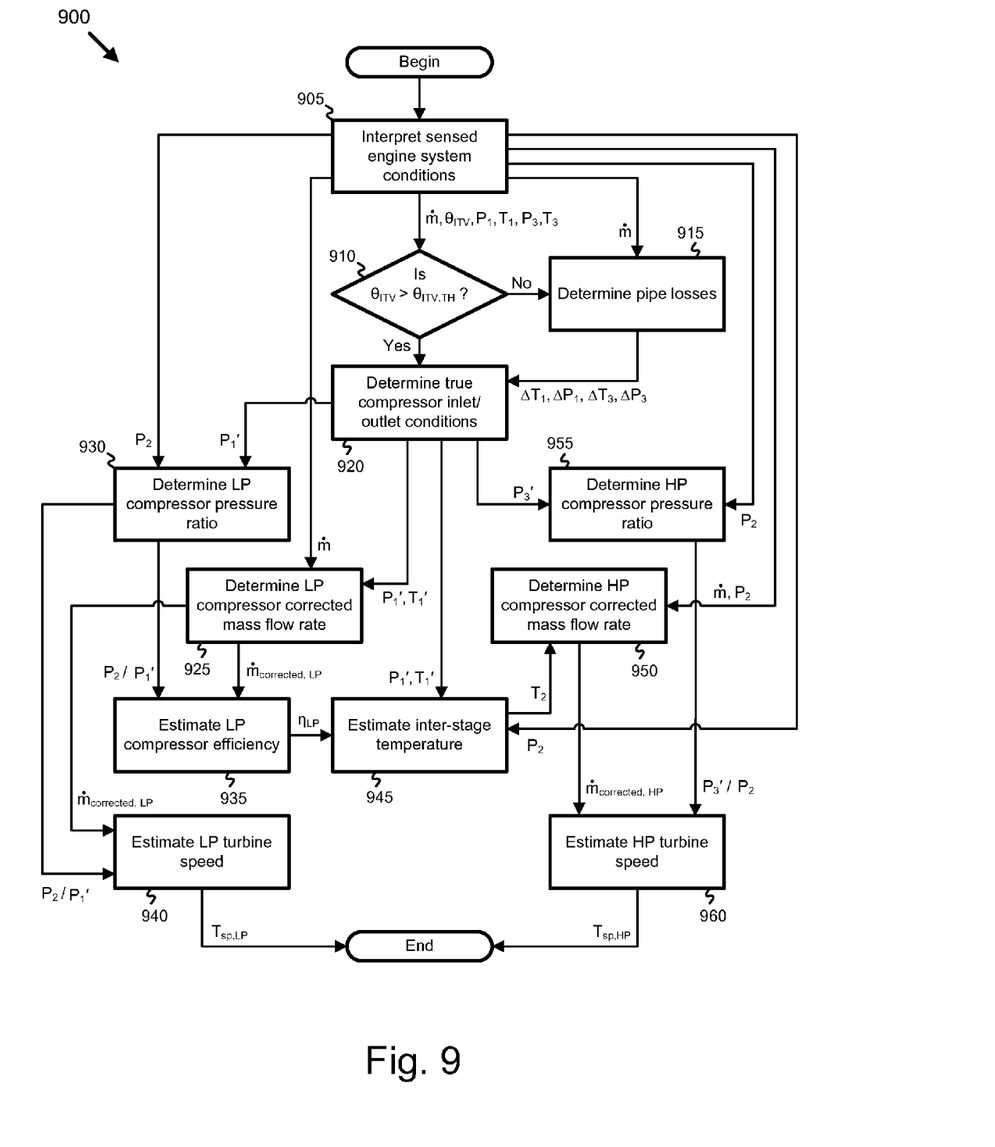
FIG. 9 is a schematic flow chart diagram illustrating one embodiment of a method for estimating the speed of a turbine of a multiple-stage turbocharger using a virtual turbine speed sensor according to one representative embodiment.

According to one embodiment, a method 900 for estimating the turbine speed of a multi-stage turbocharger using a virtual speed sensor is shown in FIG. 9. The method 900 begins by sensing and interpreting sensed engine system conditions at 905. In the illustrated embodiment, the sensed engine system conditions include the sensed intake throttle valve angle ($\theta_{ITV}$), sensed LP compressor inlet air pressure and temperature ($P_1$, $T_1$), sensed intake manifold inlet air pressure and temperature ($P_3$, $T_3$), sensed air mass flow rate ($\dot{m}$), and sensed inter-stage air pressure ($P_2$). If the intake throttle valve angle ($\theta_{ITV}$) is less than the predetermined threshold angle ($\theta_{ITV,TH}$) as determined at 910, then the method 900 proceeds to determine 915 the LP compressor inlet air pressure and temperature pipe losses ($\Delta P_1$, $\Delta T_1$) and the intake manifold inlet air pressure and temperature pipe losses ($\Delta P_3$, $\Delta T_3$). Based on the LP compressor inlet air pressure and temperature pipe losses ($\Delta P_1$, $\Delta T_1$) and according to Equations 3 and 4 above, the method 900 then determines 920 the true LP compressor inlet air pressure and temperature ($P'_1$, $T'_1$) and the true HP compressor outlet air pressure ($P'_3$). If the intake throttle valve position ($\theta_{ITV}$) is more than the predetermined threshold angle ($\theta_{ITV,TH}$) as determined at 910, then the method 900 proceeds directly to event 920 to determine the true LP compressor inlet pressure and temperature ($P'_1$, $T'_1$) and the true HP compressor outlet pressure ($P'_3$) according to one of the a predetermined look-up table approaches and/or system modeling approaches discussed above.

The method 900 determines 925 the LP compressor corrected mass flow rate ($\dot{m}_{corrected,LP}$) based on the true LP compressor inlet air pressure and temperature ($P'_1$, $T'_1$) and the air mass flow rate ($\dot{m}$) according to Equation 13. Additionally, the method 900 determines 930 the LP compressor air pressure ratio ($P_2/P'_1$) based on the sensed inter-stage air pressure ($P_2$) and the determined true LP compressor inlet air pressure $P'_1$. The LP compressor corrected air mass flow rate ($\dot{m}_{corrected,LP}$) and LP compressor air pressure ratio ($P_2/P'_1$) are compared against a LP compressor efficiency look-up table, such as table 500, to estimate 935 the LP compressor efficiency ($\eta_{LP}$). If desired, the method 900 can also include estimating 940 the LP turbine speed ($T_{sp,LP}$) by comparing the LP compressor air pressure ratio ($P_2/P'_1$) and the LP compressor corrected air mass flow rate ($\dot{m}_{corrected,LP}$) against an LP compressor speed look-up table, such as table 700.

After the LP compressor efficiency ($\eta_{LP}$) is estimated at 935, the method 900 proceeds to estimate 945 the inter-stage air temperature ($T_2$) by inputting the estimated value for the LP compressor efficiency ($\eta_{LP}$), along with the true LP compressor inlet air pressure and temperature ($P'_1$, $T'_1$) and sensed inter-stage air pressure ($P_2$), into Equation 14. The method 900 then determines 950 the HP compressor corrected air mass flow rate ($\dot{m}_{corrected,HP}$) based on the sensed inter-stage air pressure ($P_2$), estimated inter-stage air temperature ($T_2$), and the air mass flow rate ($\dot{m}$) according to Equation 13. Additionally, the method 900 determines 955 the HP compressor air pressure ratio ($P'_3/P_2$) based on the sensed inter-stage air pressure ($P_2$) and the determined true HP compressor outlet air pressure $P'_3$. The HP compressor corrected air mass flow rate ($\dot{m}_{corrected,HP}$) and HP compressor air pressure ratio ($P'_3/P_2$) are compared against an HP compressor speed look-up table, such as table 710, to estimate 960 the HP turbine speed ($T_{sp,HP}$).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A virtual turbine speed sensor for a multi-stage turbocharger system of an internal combustion engine, the multi-stage turbocharger system comprising at least two sequential turbochargers each having a compressor and a turbine, the virtual speed sensor comprising:
   a compressor efficiency module configured to estimate an efficiency of a compressor of a first of the at least two turbochargers;
   an inter-stage air temperature module configured to estimate an inter-stage temperature of air between the at least two compressors, the inter-stage temperature estimate being based at least partially on the efficiency of the compressor of the first turbocharger; and
   a turbine speed module configured to estimate a speed of a turbine of a second of the at least two turbochargers, the speed estimate of the turbine of the second turbocharger being based at least partially on the temperature estimate of air between the at least two compressors.

2. The virtual turbine speed sensor of claim 1, wherein the efficiency of the compressor of the first turbocharger is based at least partially on a sensed air pressure and air temperature at an inlet of the compressor of the first turbocharger and a mass flow rate of air entering the compressor of the first turbocharger.

3. The virtual turbine speed sensor of claim 1, further comprising a pipe loss module configured to estimate a corrected air pressure and corrected air temperature at the inlet of the compressor of the first turbocharger, the corrected air pressure and corrected air temperature being based at least partially on a sensed air pressure and sensed air temperature, wherein the efficiency of the compressor of the first turbocharger is based at least partially on the corrected air pressure, corrected air temperature, and a mass flow rate of air entering the compressor.

4. The virtual turbine speed sensor of claim 1, wherein the compressor efficiency module comprises a compressor efficiency look-up table comprising predetermined compressor efficiency values for given compressor inlet corrected air mass flow rates and compressor inlet air pressure ratios, the compressor efficiency estimate being obtainable from the compressor efficiency look-up table.

5. The virtual turbine speed sensor of claim 1, wherein the inter-stage temperature estimate is based at least partially on an inter-stage air pressure, an inlet pressure of the compressor of the first turbocharger, and an inlet temperature of the compressor of the first turbocharger.

6. The virtual turbine speed sensor of claim 1, wherein the speed estimate of the turbine of the second turbocharger is based at least partially on an air mass flow into the compressor of the second turbocharger and a pressure ratio of air entering the compressor of the second turbocharger.

7. The virtual turbine speed sensor of claim 6, wherein the turbine speed module comprises a compressor speed look-up table comprising predetermined compressor speed values for given corrected mass flow rates and pressure ratios, the turbine speed estimate being obtainable from the compressor speed look-up table.

8. The virtual turbine speed sensor of claim 6, wherein the air mass flow comprises a corrected air mass flow estimate and the pressure ratio comprises a ratio of an inter-stage pressure to a second compressor outlet pressure.

9. The virtual turbine speed sensor of claim 8, wherein the corrected air mass flow estimate is a function of the inter-stage air temperature estimate, the inter-stage air pressure, and a sensed air mass flow.

10. The virtual turbine speed sensor of claim 8, wherein the second compressor outlet pressure is a corrected second compressor outlet pressure based at least partially on a sensed second compressor outlet pressure.

11. The virtual turbine speed sensor of claim 8, further comprising a pipe loss module configured to determine air pressure pipe losses corresponding to the outlet of the compressor of the second turbocharger, wherein the corrected second compressor outlet pressure estimate comprises the sum of a sensed second compressor outlet air pressure and the air pressure pipe losses corresponding to the outlet of the compressor of the second turbocharger.

12. An internal combustion engine system, comprising:
an internal combustion engine operable to generating exhaust gas;
a multi-stage turbocharger capable of being exhaust receiving communication and air intake charge transmitting communication with the internal combustion engine, the multi-stage turbocharger comprising a high pressure turbocharger in sequence with a low pressure turbocharger, wherein the high and low pressure turbochargers each comprise a compressor coupled to a turbine;
a plurality of physical sensors operable to sense various operating conditions of the engine system; and
a virtual turbine speed sensor operable to estimate a speed of the high pressure turbine, wherein the high pressure turbine speed estimate is based at least partially on an estimated efficiency of the low pressure compressor, an estimated inter-stage temperature of air flowing between the low pressure and high pressure compressors, and at least one operating condition sensed by the plurality of physical sensors.

13. The internal combustion engine system of claim 12, wherein the estimated efficiency of the low pressure compressor is based at least partially on $$\frac{\dot{m}\sqrt{T}}{P_1}$$

and $P_2/P_1$, wherein $\dot{m}$ is a mass flow rate of air into the low pressure compressor, T is a temperature of air entering the low pressure compressor, $P_1$ is a pressure of air entering the low pressure compressor, and $P_2$ is an inter-stage pressure of air between the high and low compressors.

14. The internal combustion engine system of claim 12, wherein the estimated inter-stage temperature of air is based at least partially on $$\frac{T}{\eta_{LP}}\left(\left(\frac{P_2}{P_1}\right)^{\frac{\gamma-1}{\gamma}} - 1\right) + T,$$

wherein T is a temperature of air entering the low pressure compressor, $P_1$ is a pressure of air entering the low pressure compressor, $P_2$ is an inter-stage pressure of air between the high and low compressors, $\eta_{LP}$ is the estimated efficiency of the low pressure compressor, and γ is the heat capacity ratio of air.

15. The internal combustion engine system of claim 12, wherein the high pressure turbine speed estimate is based at least partially on $$\frac{\dot{m}\sqrt{T}}{P_1}$$

and $P_2/P_1$, wherein $\dot{m}$ is a mass flow rate of air into the high pressure compressor, T is the estimated inter-stage temperature, $P_1$ is a pressure of air entering the high pressure compressor, and $P_2$ is a pressure of air downstream of the high pressure compressor.

16. The internal combustion engine system of claim 15, further comprising an air intake throttle intermediate the high pressure compressor and the internal combustion engine, wherein the pressure of air downstream of the high pressure compressor $P_2$ is a corrected high pressure compressor outlet air pressure, the corrected high pressure compressor outlet air pressure being dependent upon a valve angle of the air intake throttle.

17. The internal combustion engine system of claim 16, wherein if the valve angle is below a predetermined valve angle threshold, the corrected high pressure compressor outlet air pressure is estimated as a function of air density, air flow velocity, air mass flow rate, length of air flow, and total air flow area.

18. The internal combustion engine system of claim 16, wherein if the valve angle is above a predetermined valve angle threshold, the corrected high pressure compressor outlet air pressure is estimated as a function of the air intake throttle valve angle and the air mass flow rate.

19. The internal combustion engine system of claim 16, wherein if the valve angle is above a predetermined valve angle threshold, the corrected high pressure compressor outlet air pressure is estimated as a function of the air intake throttle valve angle and a pressure of the air downstream of the air intake throttle.

20. The internal combustion engine system of claim 16, wherein if the valve angle is above a predetermined valve angle threshold, the corrected high pressure compressor outlet air pressure is estimated as a function of a sensed pressure of air downstream of the air intake throttle, a heat capacity ratio of air, the air mass flow rate, a gas constant of air, a temperature of air downstream of the high pressure compressor, and a flow area of air downstream of the air intake throttle.

21. The internal combustion engine system of claim 12, wherein the virtual turbine speed sensor is operable to estimate a speed of the low pressure turbine.

22. A method for estimating the speed of a high pressure turbine of a multiple-stage turbocharger system having a high pressure compressor coupled to the high pressure turbine and a low pressure turbine coupled to a low pressure compressor, the method comprising:

estimating an efficiency of the low pressure compressor;

estimating an inter-stage air temperature based at least partially on the efficiency of the low pressure compressor; and estimating a speed of the high pressure turbine based at least partially on the inter-stage temperature.

23. The method of claim 22, wherein estimating the efficiency of the low pressure compressor comprises determining a low pressure compressor inlet pressure ratio and a low pressure compressor inlet corrected air mass flow rate, and comparing the determined low pressure compressor inlet pressure ratio and low pressure compressor inlet corrected air mass flow rate with predetermined low pressure compressor efficiency values.

24. The method of claim 22, wherein estimating the inter-stage air temperature comprises determining a low pressure compressor inlet air pressure, an inter-stage air pressure, and a low pressure compressor inlet air temperature.

25. The method of claim 22, wherein estimating the high pressure turbine speed comprises determining a high pressure compressor inlet pressure ratio and a high pressure compressor inlet corrected air mass flow rate based at least partially on an inter-stage pressure and the inter-stage temperature, and comparing the determined high pressure compressor inlet pressure ratio and corrected air mass flow rate with predetermined high pressure compressor turbine speeds.

* * * * *